(12) United States Patent
Gulotta

(10) Patent No.: US 11,370,506 B1
(45) Date of Patent: Jun. 28, 2022

(54) BICYCLE HANDLEBAR CUSHIONING SYSTEM

(71) Applicant: Robert K. Gulotta, Eau Claire, WI (US)

(72) Inventor: Robert K. Gulotta, Eau Claire, WI (US)

( * ) Notice: Subject to any disclaimer, the term of this patent is extended or adjusted under 35 U.S.C. 154(b) by 0 days.

(21) Appl. No.: 17/122,685

(22) Filed: Dec. 15, 2020

(51) Int. Cl.
  *B62K 21/26* (2006.01)

(52) U.S. Cl.
  CPC ................ *B62K 21/26* (2013.01)

(58) Field of Classification Search
  CPC ............................................. B62K 21/26
  See application file for complete search history.

(56) References Cited

U.S. PATENT DOCUMENTS

| | | |
|---|---|---|
| 3,713,350 A | 1/1973 | Brilando |
| 4,380,093 A | 4/1983 | Morgan |
| 5,193,246 A | 3/1993 | Huang |
| 5,207,713 A * | 5/1993 | Park .................. B60R 21/05 280/750 |
| 5,209,508 A | 5/1993 | Lennon |
| 5,253,435 A | 10/1993 | Auger |
| 5,348,360 A | 9/1994 | Mencarelli |
| 6,821,218 B2 | 11/2004 | Byrne |
| 8,881,347 B2 | 11/2014 | Feinstein |
| 2004/0007086 A1 | 1/2004 | Cummings |
| 2005/0043110 A1 | 2/2005 | Lindsey |
| 2007/0137410 A1 * | 6/2007 | Chang .................. B62K 21/26 74/551.9 |
| 2018/0362111 A1 * | 12/2018 | Gulotta .................. B62K 21/26 |

* cited by examiner

*Primary Examiner* — Nicky A Johnson

(57) ABSTRACT

A bicycle handlebar cushioning system includes a mount contoured to be complementary in shape to a set of bicycle handlebars. The mount is elongated and includes elongated break therein for receiving the handlebars such that the mount is frictionally engaged with the bicycle handlebars. A perimeter wall of the mount has an outer surface having an elongated receiving space therein. A cushioning member is removably positioned in the receiving space. The cushioning member comprises a plate removably positioned in the receiving space. A resiliently compressible member is positioned on a top surface of the plate. A height of the resiliently compressible member and the plate is greater than a depth of the receiving space such that the resiliently compressible member extends outwardly from the receiving space.

20 Claims, 10 Drawing Sheets

BICYCLE HANDLEBAR CUSHIONING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to handlebar cushioning devices and more particularly pertains to a new handlebar cushioning device for allowing bicycle rider to add cushioning elements on bicycle handlebars to increase the comfort of the user when the user is required to grip or lean on the handlebars for extended periods of time. The disclosure further includes a system wherein the cushioning elements are removable inserts that are interchangeable and replaceable as needed to selectively alter the compressibility and overall feel of the handlebars.

(2) Description of Related Art Including Information Disclosed Under 37 CFR 1.97 and 1.98

The prior art relates to handlebar cushioning devices that are taped onto or otherwise secured in such a manner not easily modified wherein a bicycle rider cannot quickly, without effort, alter the tactile attributes of their handlebars.

BRIEF SUMMARY OF THE INVENTION

An embodiment of the disclosure meets the needs presented above by generally comprising a mount contoured such that the mount is complementary in shape to a set of bicycle handlebars. The mount has a perimeter wall with a first end and a second end and is elongated from the first end to the second end. The perimeter wall has an elongated break therein extending between and through the first and second ends. The break receives the handlebars and the mount is resiliently flexible to snap onto and frictionally engage the bicycle handlebars. The perimeter wall has an upper portion and a lower portion positioned opposite of each other and the break is positioned in the lower portion. The perimeter wall has an outer surface having an elongated receiving space therein that is bounded by a peripheral edge. The outer surface faces away from the handlebars when the mount is positioned on the handlebars. The mount has an inner surface abutting the handlebars and the receiving space has a bottom wall. A cushioning member is removably positioned in the receiving space. The cushioning member comprises a plate with a top surface, a bottom surface and a perimeter edge. The plate is removably positioned in the receiving space such that the perimeter edge is bounded by the peripheral edge. A resiliently compressible member is positioned on the top surface of the plate. A height of the resiliently compressible member and the plate is greater than a depth of the receiving space such that the resiliently compressible member extends outwardly from the receiving space.

In another embodiment, the disclosure includes a set of bicycle handlebars. A mount is contoured such that the mount is complementary in shape to the set of bicycle handlebars. The mount has a perimeter wall having a first end and a second end and is elongated from the first end to the second end. The perimeter wall has an elongated break therein extending between and through the first and second ends. A first free edge of the perimeter wall and a second free edge of the perimeter wall is defined on opposite sides of the break. The break receives the set of bicycle handlebars, wherein the mount is resiliently flexible such that the mount is snapped onto and frictionally engaged with the set of bicycle handlebars. The perimeter wall has an upper portion and a lower portion positioned opposite of each other. The break is positioned in the lower portion. The mount is comprised of a rigid and resiliently bendable material. A cushioning member is removably attached to the mount. The cushioning member comprises a plate that has a top surface, a bottom surface and a perimeter edge. The plate comprises a rigid material. A resiliently compressible member is positioned on the top surface of the plate. A securing member releasably secures the cushioning member to the mount wherein the mount is positioned between the set of bicycle handlebars and the cushioning member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
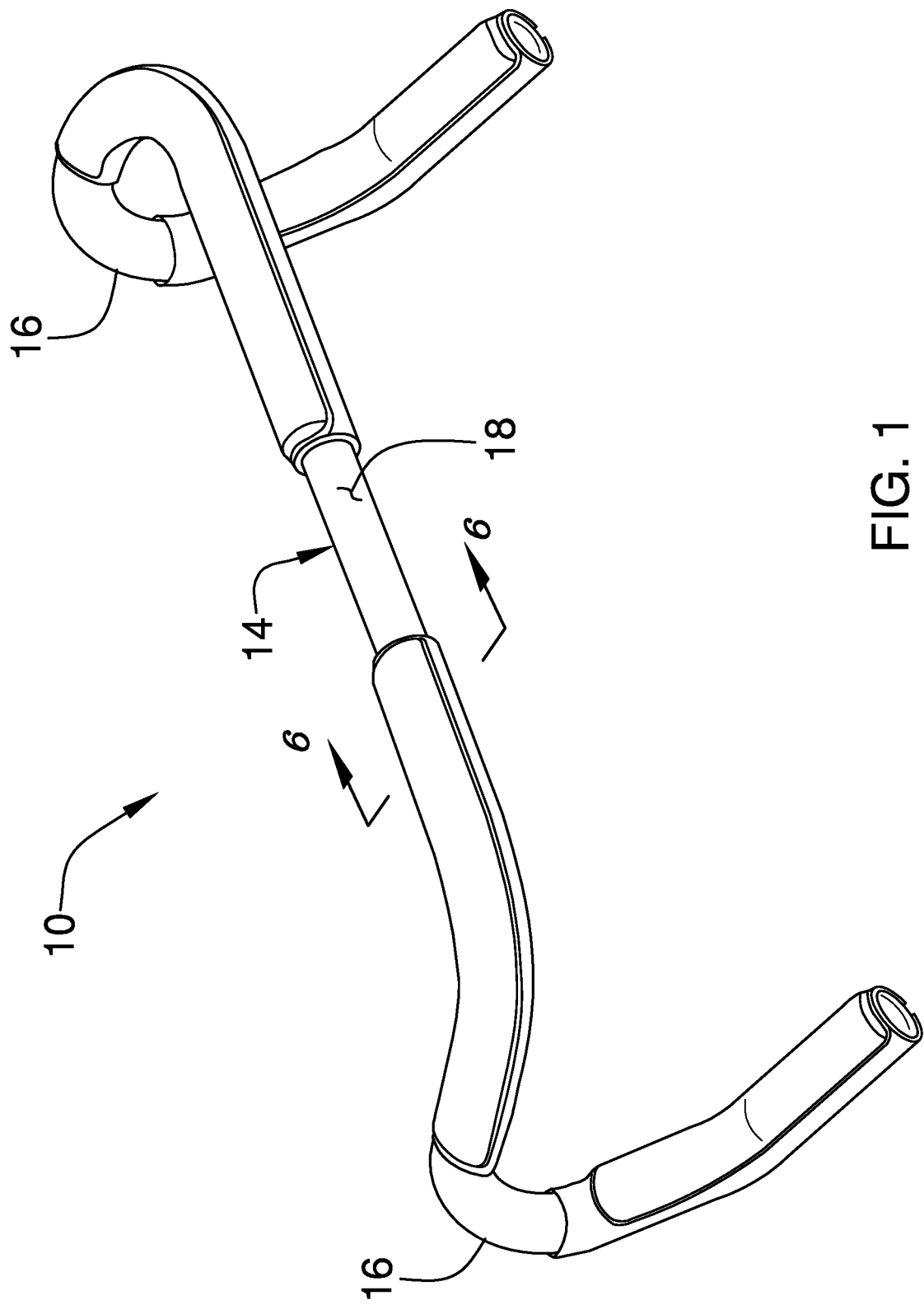
FIG. 1 is a top isometric view of a bicycle handlebar cushioning system according to an embodiment of the disclosure.

With reference now to the drawings, and in particular to FIGS. 1 through 13 thereof, a new handlebar cushioning device embodying the principles and concepts of an embodiment of the disclosure and generally designated by the reference numeral 10 will be described.

As best illustrated in FIGS. 1 through 13, the bicycle handlebar cushioning system 10 generally comprises a mount 12 configured to releasably engage and be retained on a set of bicycle handlebars 14. The bicycle handlebars 14 are conventional and may, in particular, comprise what are known as drop bars 16 used on road bikes such as those found in long distance and race bicycling. These types of bicycle handlebars 14 generally include a stem, not shown, attached to a crosspiece 18 having a pair of opposed ends. To each of the opposed ends is attached a drop, or drop bars 16, which extends forward from the crosspiece 18 and then arcs downwardly and back to form a laterally angled U-shaped structure. The junctures of the crosspiece 18 and the drops 16 are also formed by arcs.

Figure 6:
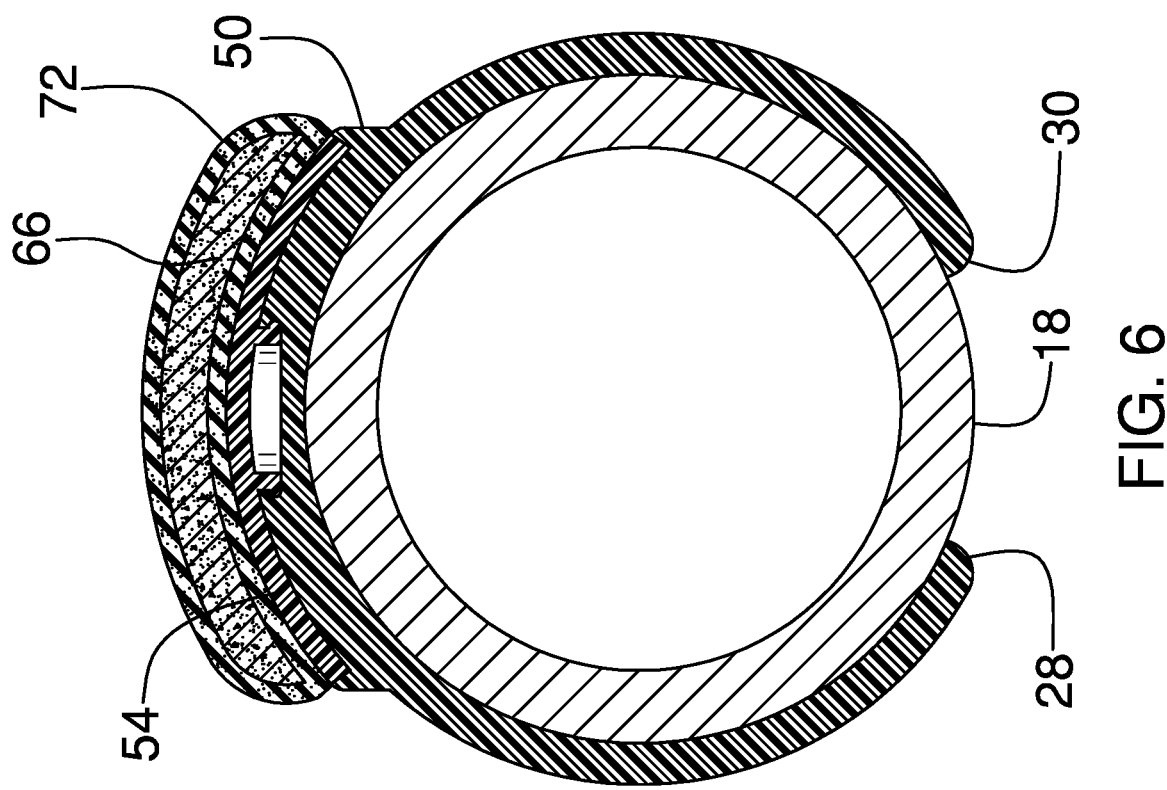
FIG. 6 is a cross-sectional view of an embodiment of the disclosure taken along line 6-6 of FIG. 1.
Figure 11:
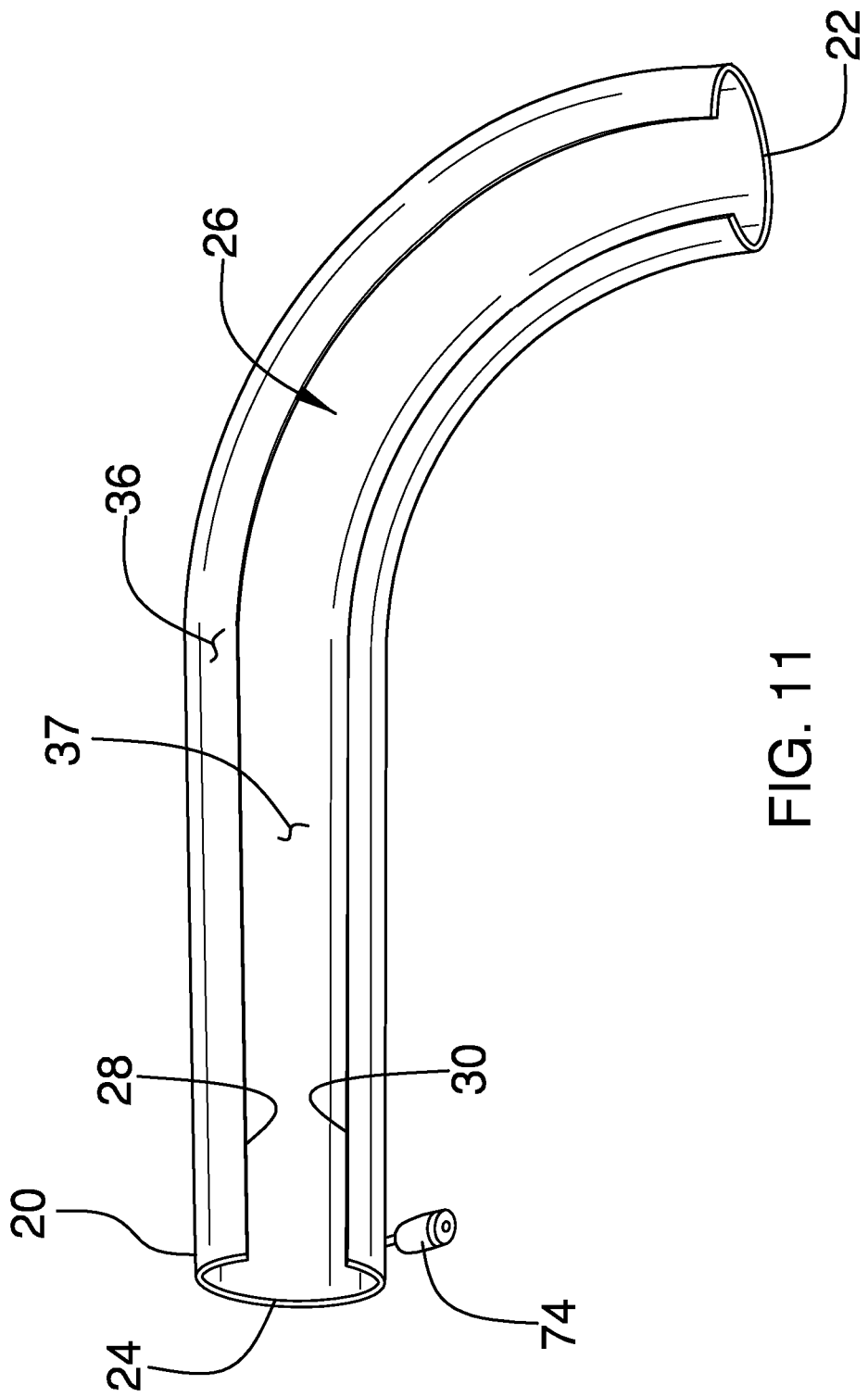
FIG. 11 is a bottom view of an embodiment of a mount of the disclosure.
Figure 13:
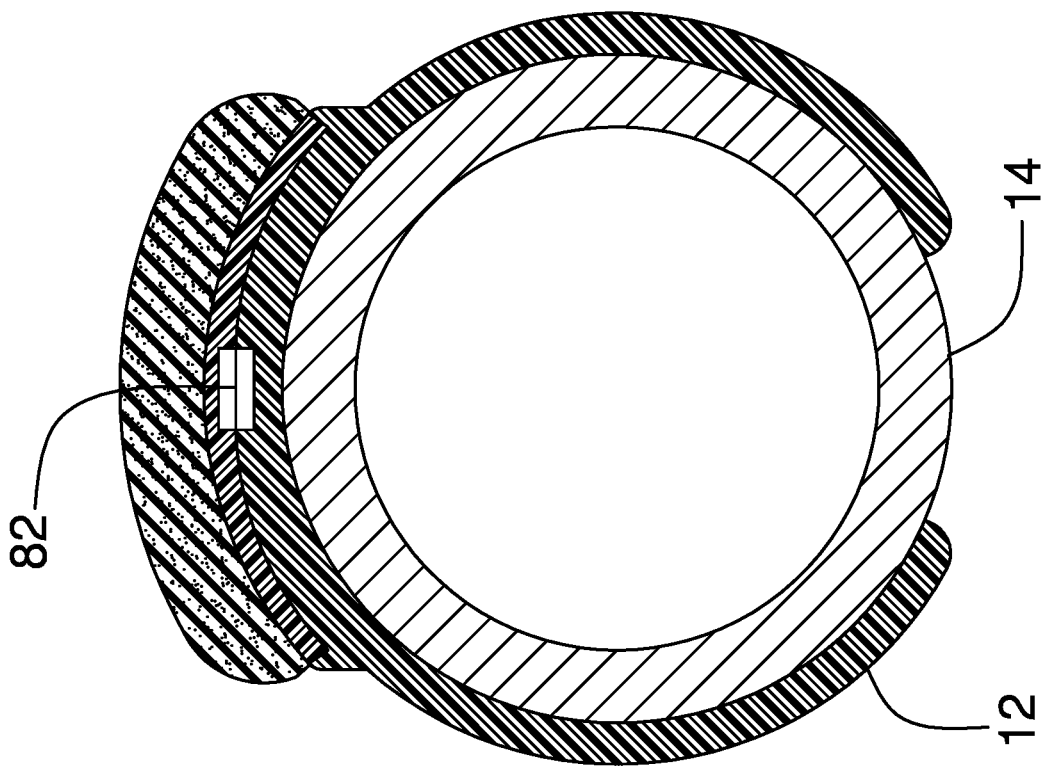
FIG. 13 is a cross-sectional view of an alternate embodiment of a securing member of the disclosure.
Figure 12:
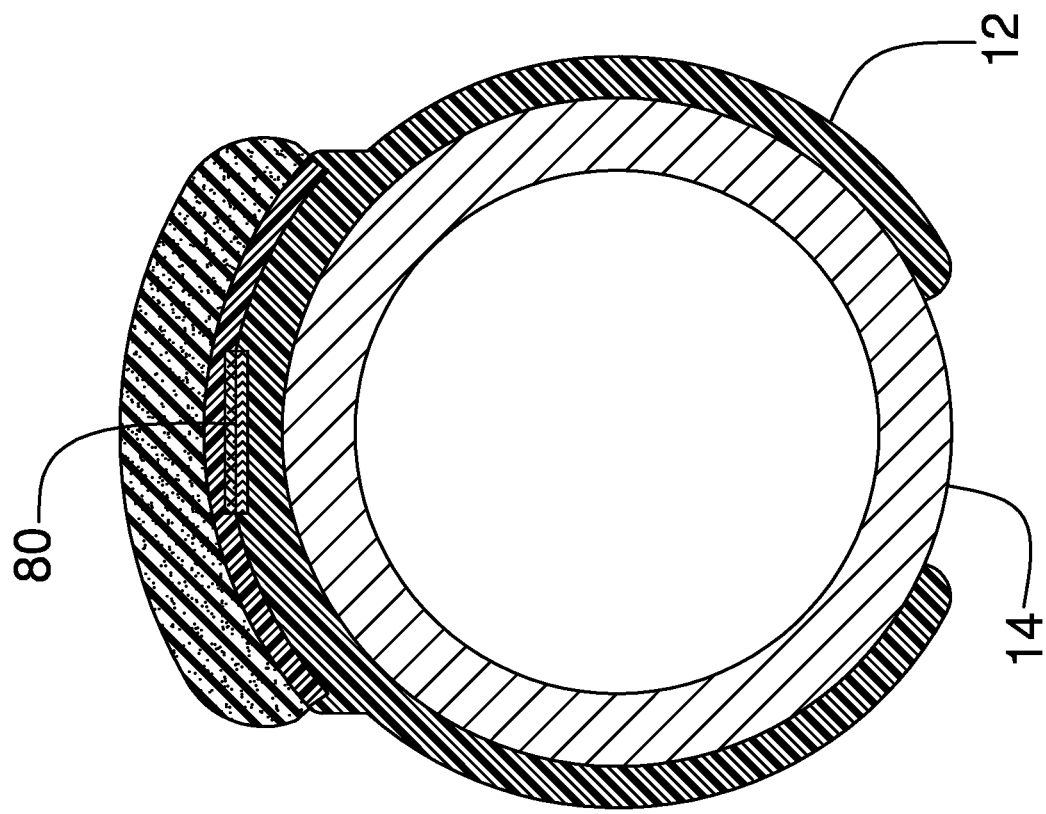
FIG. 12 is a cross-sectional view of an alternate embodiment of a securing member of the disclosure.

The mount 12 is contoured such that the mount 12 is configured to be complementary in shape to the bicycle handlebars 14. While the handlebars 14 shown in the Figures have a tubular or cylindrical cross-section, it should be understood that handlebars 14 may be provided with a relatively planar upper surface. Regardless, the mount 12 will be contoured as needed to fit the requisite handlebars 14 and thus may have a generally cylindrical cross-section as shown in FIG. 6 or may have a portion being relatively planar as needed. The mount 12, consequently, is substantially a sleeve with a perimeter wall 20 having a first end 22 and a second end 24 and is elongated from the first end 22 to the second end 24. As shown in FIG. 11 best, the perimeter wall 20 has an elongated break 26 therein extending between and through the first 22 and second 24 ends. A first free edge 28 of the perimeter wall 20 and a second free edge 30 of the perimeter wall are defined on opposite sides of the break 26. The break 26 is configured to receive the handlebars 14. The mount 12 is comprised of a resiliently bendable material but is sufficiently rigid such that the mount 12 snaps onto and is configured to frictionally engage the bicycle handlebars 14. Materials typically used may include, for example, plastics, silicones, and carbon composites such as graphite. The perimeter wall 20 has an upper portion 32 and a lower portion 34 positioned opposite of each other wherein the break 26 is positioned in the lower portion 34.

Figure 3:
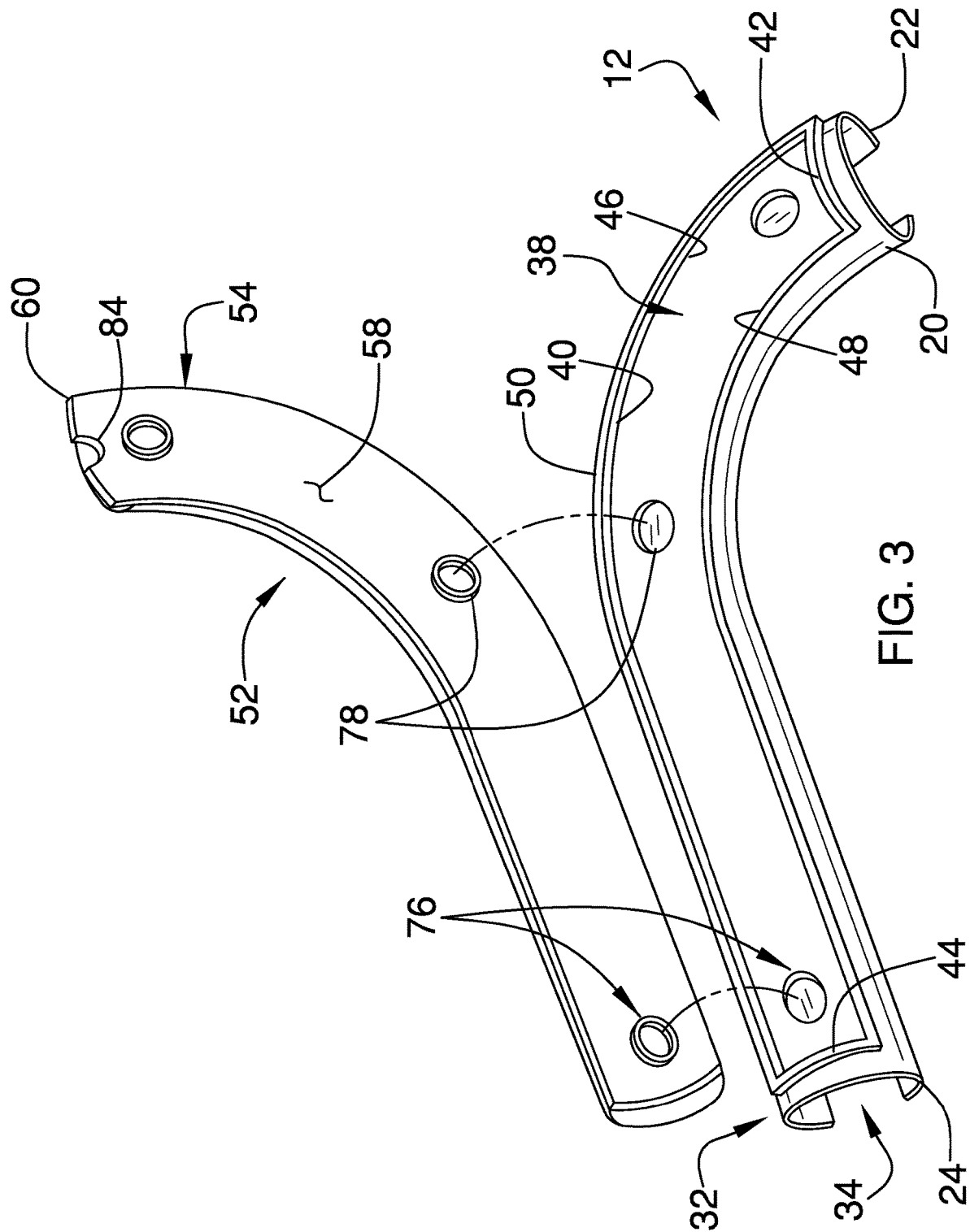
FIG. 3 is an isometric view of an embodiment of the disclosure showing a top of a mount and a bottom of a cushioning member.
Figure 4:
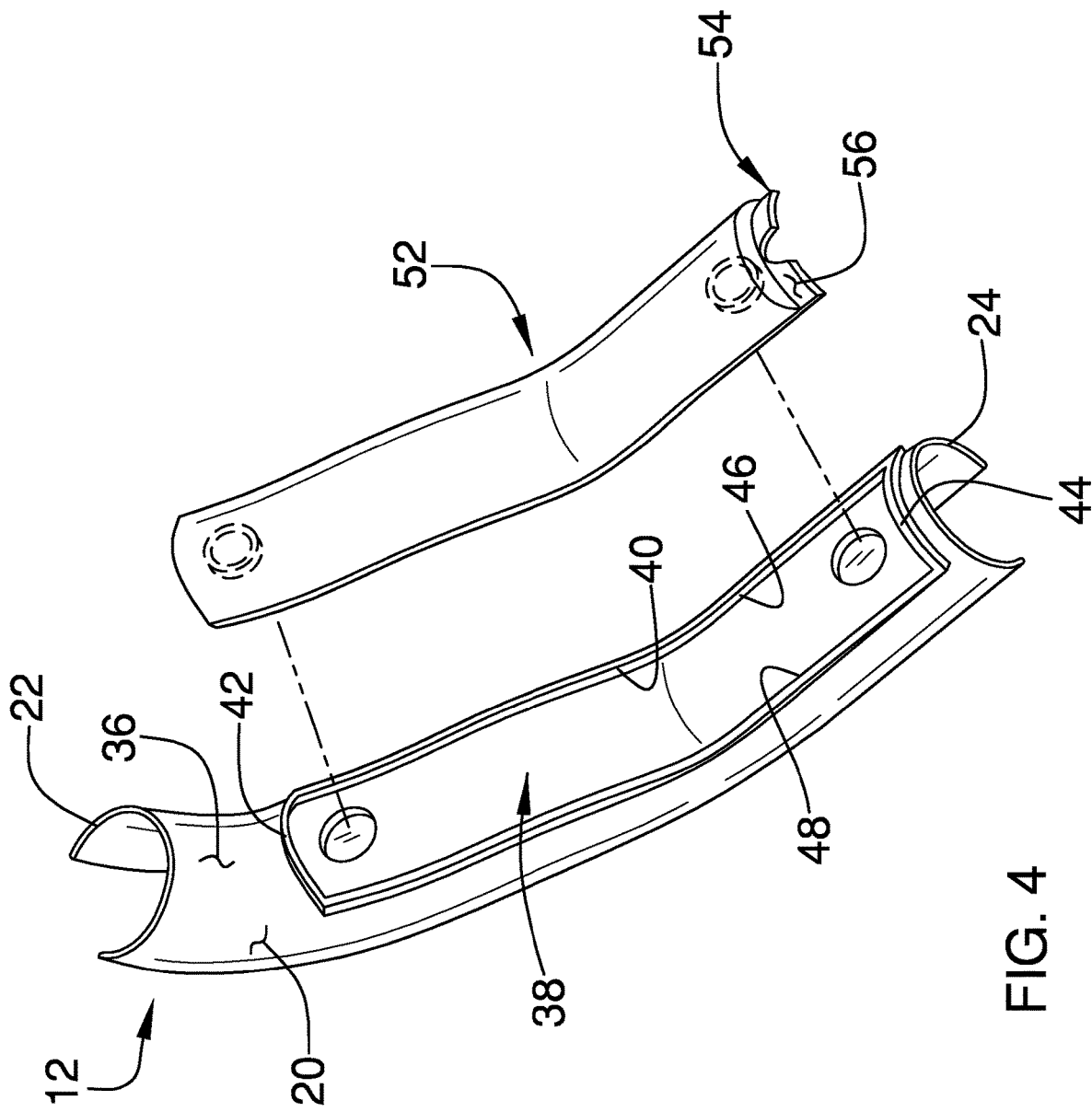
FIG. 4 is a top isometric view of an embodiment of the disclosure.

As shown best in FIGS. 3 and 4, the perimeter wall 20 has an outer surface 36, opposite of an inner surface 37, having a receiving space 38 therein which is elongated, wherein the inner surface 37 abuts the handlebars 14. The receiving space 38 extends from a position adjacent to the first end 22 to a position adjacent to the second end 24. The receiving space 38 is bounded by a peripheral edge 40. The peripheral edge 40 includes a first edge 42 positioned adjacent to the first end 22, a second edge 44 positioned adjacent to the second end 24. A forward edge 46 and a rearward edge 48 of the receiving space 38 each extends between the first 42 and second 44 edges. The forward 46 and rearward 48 edges are each spaced from the break 26 a distance greater than 0.25 inches and more typically a distance greater than 0.50 inches. Furthermore, the forward 46 and rearward 48 edges are spaced from each other a distance equal to at least 0.75 inches. The receiving space 38 may be formed by a depression extending downwardly into the outer surface 36. Alternatively, or in addition to extending downwardly into the outer surface, the receiving space 38 may be defined by an upwardly extending outer wall 50 formed in the outer surface 36 to bound the receiving space 38. Regardless of the structure utilized, the receiving space 38 represents a "trough" on the mount 12 for receiving a cushioning member 52.

The cushioning member 52 is removably secured to the mount 12 such that mount is 12 positioned between the cushioning member 52 and the mount 12. In embodiments that include the receiving space 38, the cushioning member 52 is positioned in the receiving space 38. The cushioning member 52 may include a plurality of cushioning members 52 to allow a user of the system 10 to selectively choose between the cushioning members 52 depending on the requirements and personal tastes of the user.

The cushioning member 52 includes a plate 54 that has a top surface 56, a bottom surface 58 and a perimeter edge 60. The plate 54 is comprised of a generally rigid material which may have some bendability but will retain its shape. Therefore, the plate 54 may be comprised of plastics, carbon composites such as graphite, elastomers, metals and the like. The plate 54 will have a shape that contours to the shape of the receiving space 38, and by extension the mount 12, such as is shown in FIG. 4 where the receiving space 38 includes a bend or curved configuration. The plate 54 is removably positioned in the receiving space 38 such that the perimeter edge 60 is bounded by the peripheral edge 40.

A resiliently compressible member 62 is positioned on and non-removably attached to the top surface 56 of the plate 54. A height of the resiliently compressible member 62 and the plate 54 is greater than a depth of the receiving space 38 such that the resiliently compressible member 62 extends upwardly outwardly from the receiving space 38. This ensures that the resiliently compressible member 62 is abutted against the user's hand when their hand is positioned on the resiliently compressible member 62.

Figure 5:
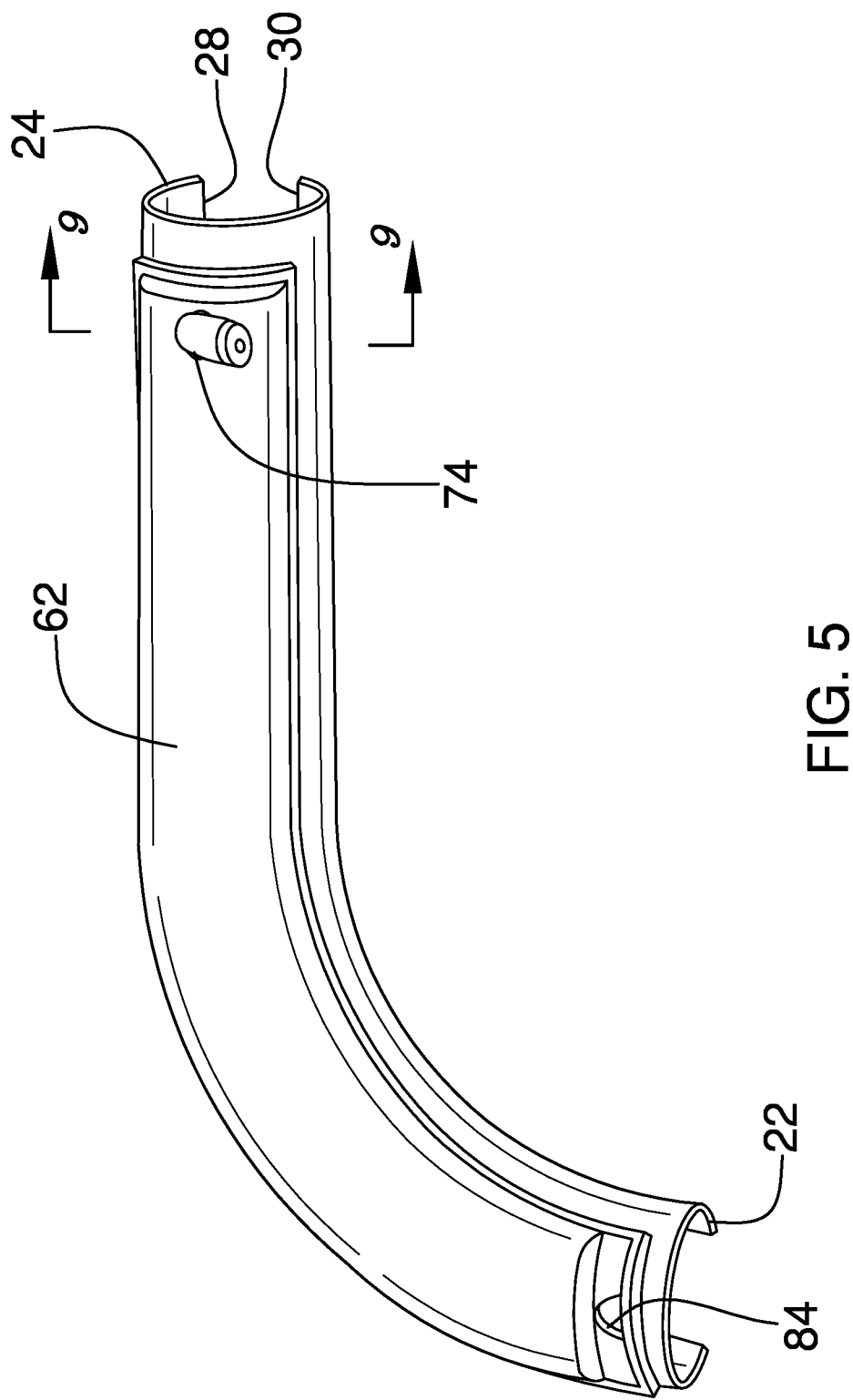
FIG. 5 is a top isometric view of an embodiment of the disclosure.
Figure 7:
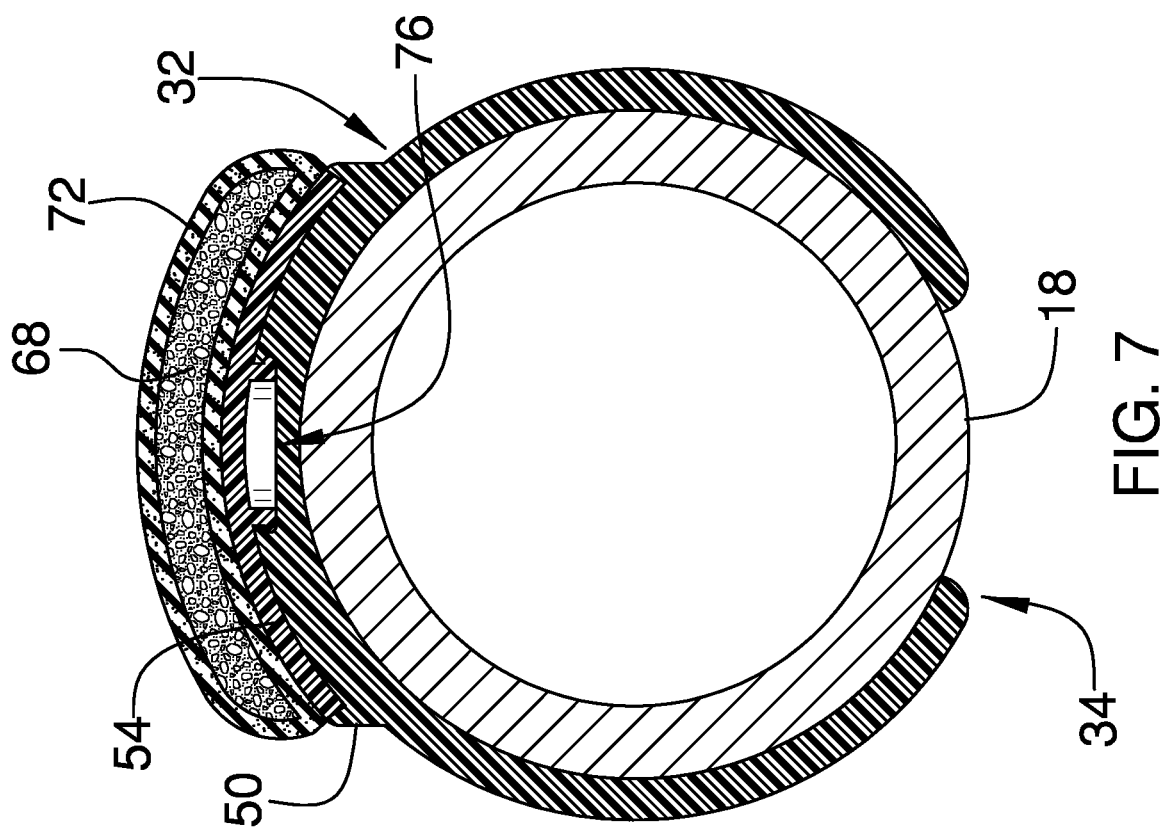
FIG. 7 is a cross-sectional view of an embodiment of the disclosure.
Figure 9:
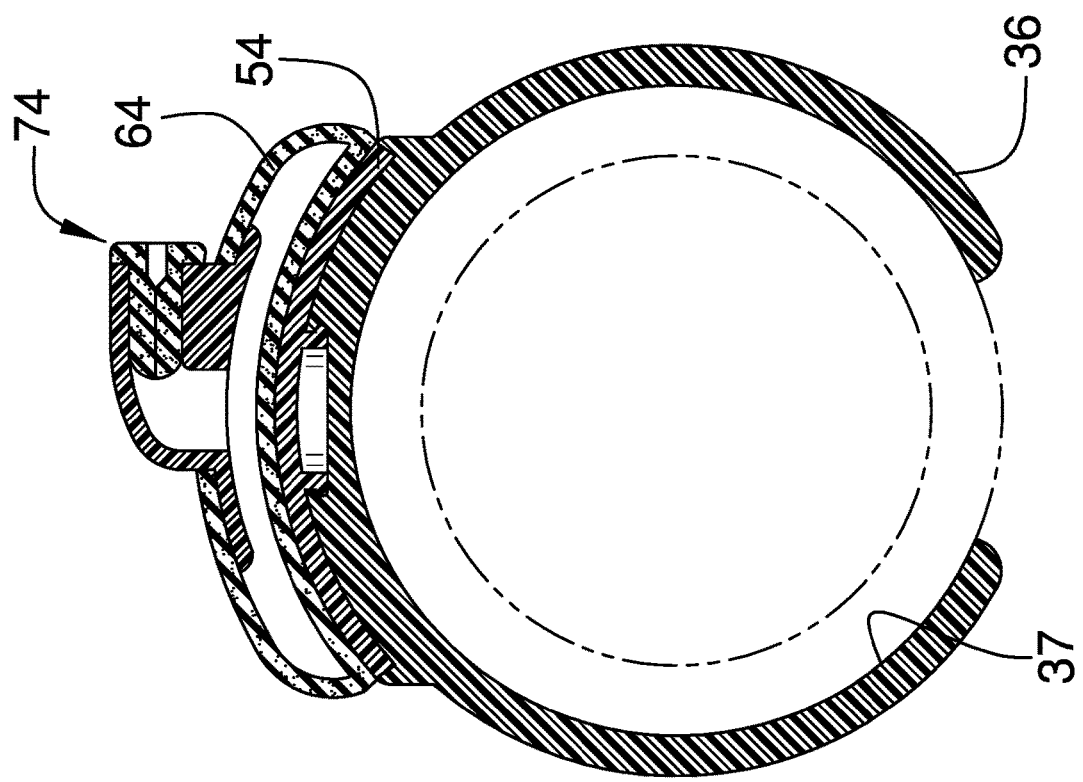
FIG. 9 is a cross-sectional view of an embodiment of the disclosure taken along line 9-9 of FIG. 5.
Figure 8:
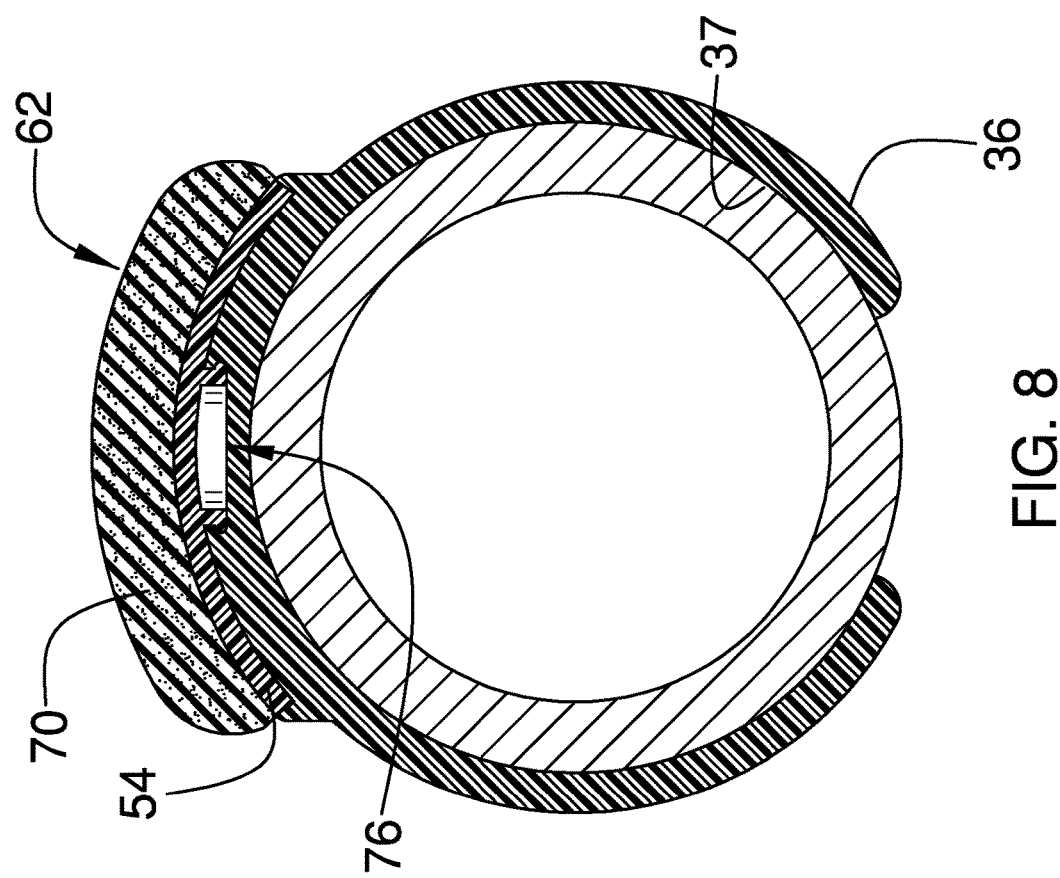
FIG. 8 is a cross-sectional view of an embodiment of the disclosure.

The resiliently compressible member 62 may be constructed in any conventional manner. In particular, preferred structures include air bladders 64, foam materials 66, gel materials 68 including gel foams, and compressible coatings 70. Foams 66 and gels 68, as shown in FIGS. 6 and 7, may have a protective coating 72 or covering comprising a flexible plastic, silicone, or elastomer, for example. Compressible coatings 70, as shown in FIG. 8, will typically include elastomers, silicones, plastics and the like. FIGS. 5 and 9 depict a bladder 64 with a valve 74 that allows a user to adjust the amount of air within the bladder 64. The valve 74 may be positioned as shown in FIG. 5 or may include a "pigtail" type construction having a conduit extending between the valve 74 and the bladder 64 to allow the valve 74 to be tucked into a well in the mount 30 or resiliently compressible member 62 or clipped to the to the handlebars 14 or mount 12. Each of the resiliently compressible members 62 may be provided with different thicknesses, compression resiliencies, and surface textures to vary the cushioning and tactile characteristics for the user. Materials utilized may also be selected by their ability to transfer heat or absorb perspiration.

In the embodiment including the receiving space 38, the plate 54 may frictionally engage the peripheral edge 40 and "snap" into the receiving space 38. However, a frictional engagement may not provide sufficient coupling action between the plate 54 and the mount 12. Therefore, a securing member 76 may be utilized to releasably secure the cushioning member 52 to the mount 12. The securing member 76 may be used in combination with a frictional engagement and may also be used where a frictional engagement is not utilized, such as when the mount 12 does not include a receiving space 38. Generally, any securing member structure may incorporated into the system 10, however, securing members 76 that are most typically used include male and female snap members 78, hook and loop couplers 80, and magnetic couplers 82. The magnetic couplers 82 typically include either a pair of magnets, one in the plate 54 and one in the mount 12, or a combination of a magnet and magnetically attractive metal. The securing member 76 may also be utilized where a receiving space 38 is not utilized wherein the plate 54 is secured to the outer surface 36 of the mount 12 without being retained by a peripheral edge.

In some embodiments, the plate 44 has a notch 84 therein such as in the perimeter edge 60. The notch 84 is positioned adjacent to one of the first 42 and second 44 edges, when the plate 44 is positioned in the receiving space 38, to facilitate removal of the plate 44 from the receiving space 38.

Figure 10:
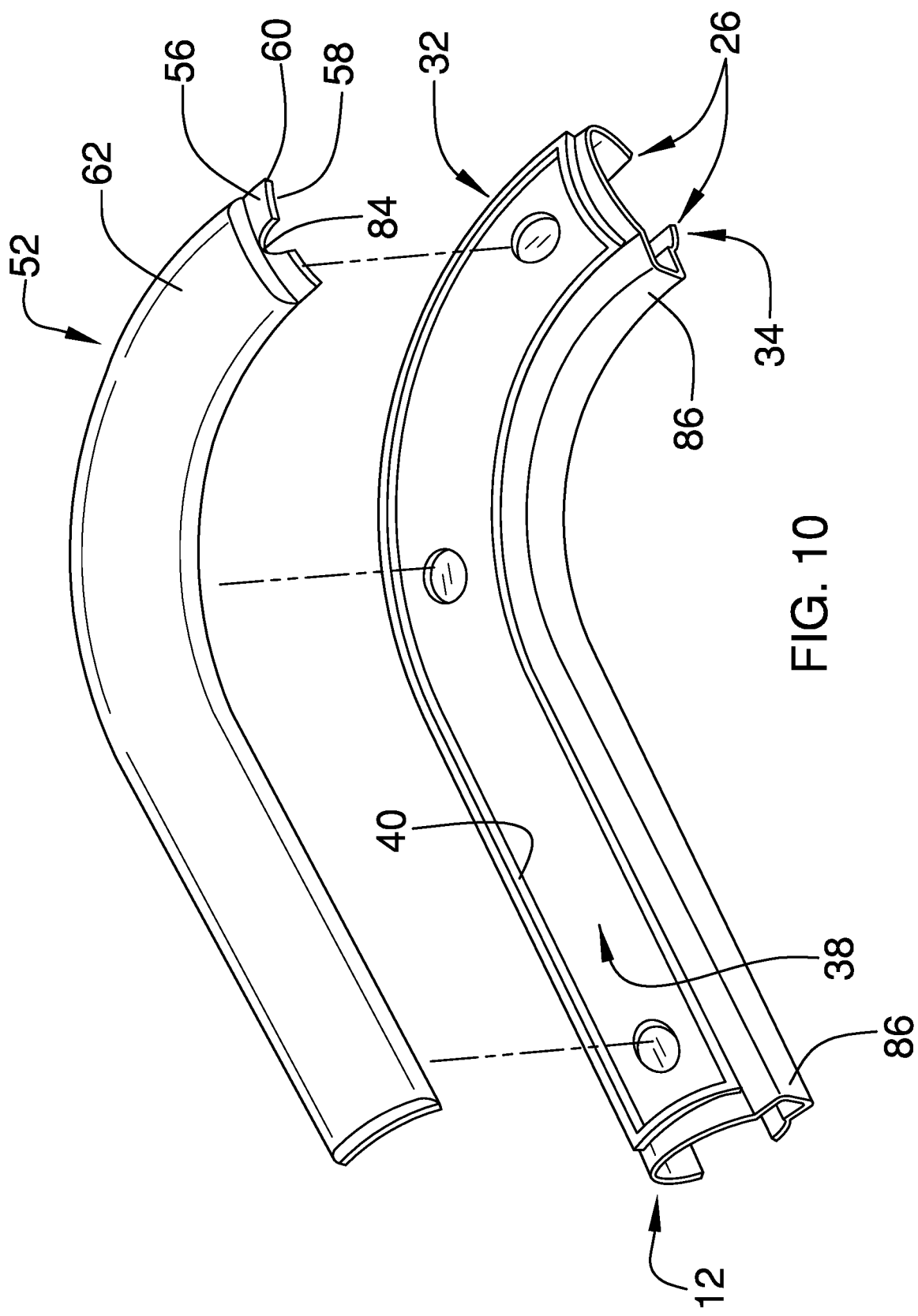
FIG. 10 is a top isometric view of an embodiment of the disclosure including a cable channel.

In an alternate embodiment of the mount 12 shown in FIG. 10, the perimeter wall 20 includes a cable channel 86 for receiving the brake cable of a bicycle. Since these cables tend to run along the handlebars 14, and are secured thereto in a number or ways, the mount 12 may be used to secure the brake cables as well as remove the need for other cable securing means. The cable channel 86 is formed in the interior surface 37 and extends between and through the first 22 and second 24 ends. The cable channel 86 may form a raised area in the outer surface 36 opposite of its position in the inner surface 37. When the mount 12 is placed on the handlebars 14, the user first aligns the brake cable with the cable channel 86 and then snaps the mount 12 onto the handlebars 14 as described herein.

In use, a bicyclist selects a mount 12 that matches the shape and contour of their handlebars 14. It should be understood that the bicyclist will use at least two mounts 12 positioned on opposite ends of the crosspiece 18. The mount 12 will extend to the drop bars 16. Additional mounts 12 may be positioned on the drop bars 16 themselves and such an embodiment is fully contemplated by the instant disclosure. Either before or after the user snaps the mount 12 onto the handlebars 14, a cushioning member 52 is selected for the particular riding conditions anticipated by the bicyclist. Thus, the cushioning member 52 may be selected for cushioning offered, its tactile attributes, as well as, optionally, its absorptive properties. The cushioning member 52 may be quickly removed and replaced when worn out or if the bicyclist determines that a cushioning member with different characteristics is warranted. Essentially, the cushioning member 52 provides comfort for the hands of the bicyclist when gripping the handlebars for long durations of time is required. The receiving space 38 ensures stability of the cushioning member relative to the mount 12 without requiring permanent fixing of the cushioning member to the mount 12. However, this structure, while stable, also allows cushioning members 52 to be removed and replaced without special tools and even while the bicyclist is bicycling.

Figure 2:
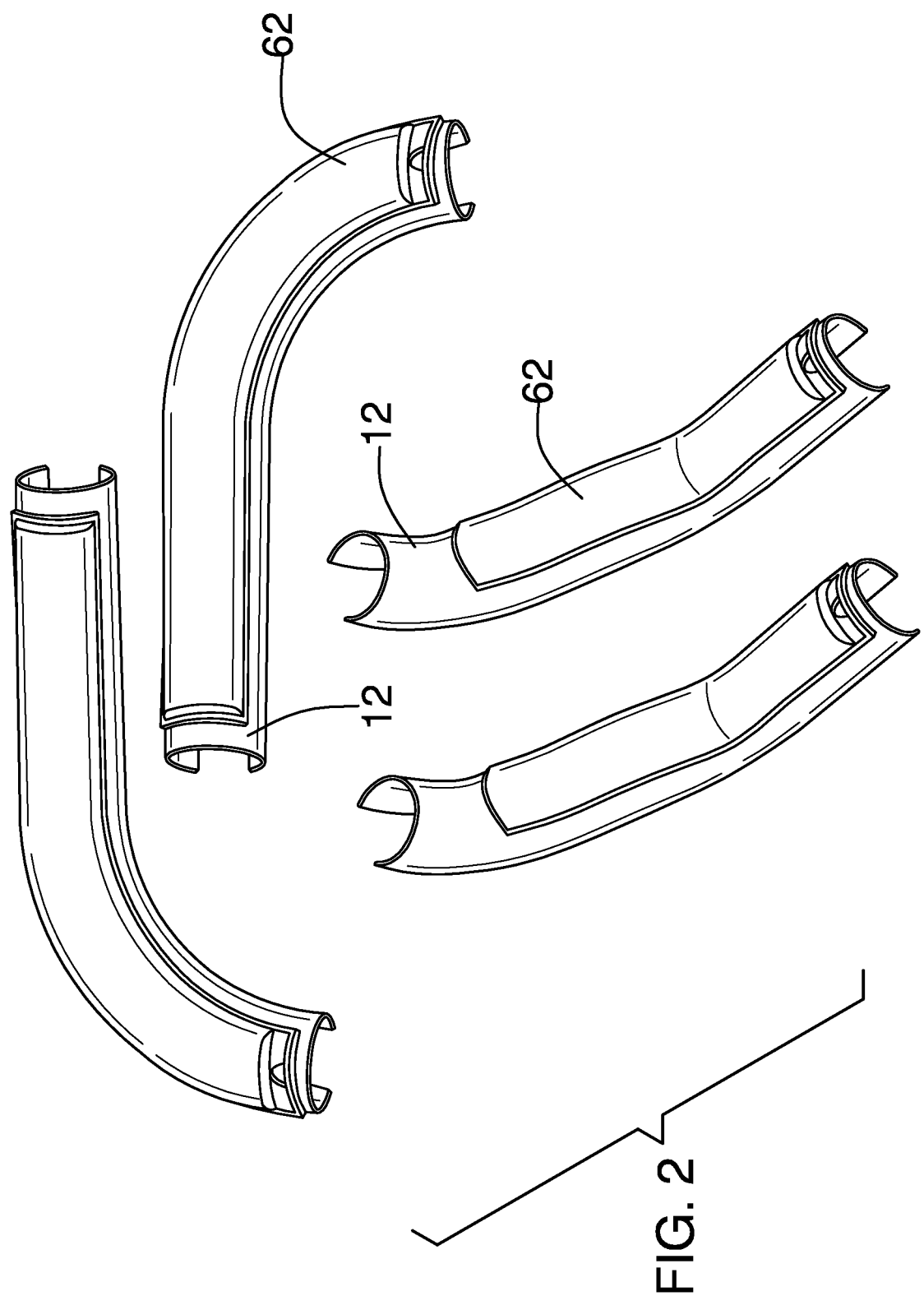
FIG. 2 is a top isometric view of an embodiment of the disclosure.

As can be seen in FIGS. 1 and 2, the system may include a set of mounts 12 each having a shape configured for different portions of the handlebars 14. The system 10 not only allows the user to select which portions of the handlebars are to be covered, but also allows for different types of cushioning members 52 to be used on different areas of the handlebars 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cushioning system for a positioning on bicycle handlebars, the system comprising:
   a mount being contoured such that the mount is configured to be complementary in shape to a set of bicycle handlebars, the mount having a perimeter wall, the perimeter wall having a first end and a second end and being elongated from the first end to the second end, the perimeter wall having an elongated break therein extending between and through the first and second ends, wherein the break is configured to receive the handlebars, the mount being resiliently flexible such that the mount snaps onto and is configured to frictionally engage the bicycle handlebars, the perimeter wall having an upper portion and a lower portion positioned opposite of each other, the break being positioned in the lower portion;
   the perimeter wall having an outer surface having a receiving space therein that is elongated, the receiving space being bounded by a peripheral edge, the outer surface facing away from the handlebars when the mount is positioned on the handlebars, the mount having an inner surface abutting the handlebars, the receiving space having a bottom wall;

a cushioning member being removably positioned in the receiving space, the cushioning member comprising:
a plate having a top surface, a bottom surface and a perimeter edge, the plate being removably positioned in the receiving space such that the perimeter edge is bounded by the peripheral edge; and
a resiliently compressible member being positioned on the top surface of the plate, a height of the resiliently compressible member and the plate being greater than a depth of the receiving space such that the resiliently compressible member extends outwardly from the receiving space.

2. The cushioning system according to claim 1, wherein the mount is comprised of a rigid and resiliently bendable material.

3. The cushioning system according to claim 1, wherein the receiving space extends from a position adjacent to the first end to a position adjacent to the second end.

4. The cushioning system according to claim 3, wherein the receiving space is spaced from the break a distance greater than 0.25 inches.

5. The cushioning system according to claim 3, the peripheral edge includes a first edge positioned adjacent to the first end, a second edge positioned adjacent to the second end, a forward edge and a rearward edge each extending between the first and second edges, the forward and rearward edges being spaced from each other a distance equal to at least 0.75 inches.

6. The cushioning system according to claim 1, the peripheral edge includes a first edge positioned adjacent to the first end, a second edge positioned adjacent to the second end, a forward edge and a rearward edge each extending between the first and second edges, the forward and rearward edges being spaced from each other a distance equal to at least 0.75 inches.

7. The cushioning system according to claim 1, wherein the resiliently compressible member is selected from the group including an air bladder, a foam material, a gel material, and a compressible coating.

8. The cushioning system according to claim 7, further including a securing member releasably securing the cushioning member to the mount.

9. The cushioning system according to claim 8, wherein the securing member is selected from the group including male and female snap members, hook and loop couplers, and magnetic couplers.

10. The cushioning system according to claim 9, wherein the perimeter edge has a notch therein to facilitate removal of the plate from the receiving space.

11. The cushioning system according to claim 1, further including a securing member releasably securing the cushioning member to the mount.

12. The cushioning system according to claim 11, wherein the securing member is selected from the group including male and female snap members, hook and loop couplers, and magnetic couplers.

13. The cushioning system according to claim 12, wherein the perimeter edge has a notch therein to facilitate removal of the plate from the receiving space.

14. The cushioning system according to claim 1, wherein the perimeter edge has a notch therein to facilitate removal of the plate from the receiving space.

15. A cushioning system for a positioning on bicycle handlebars, the system comprising:
a set of bicycle handlebars;
a mount being contoured such that the mount is complementary in shape to the set of bicycle handlebars, the mount having a perimeter wall, the perimeter wall having a first end and a second end and being elongated from the first end to the second end, the perimeter wall having an elongated break therein extending between and through the first and second ends, a first free edge of the perimeter wall and a second free edge of the perimeter wall being defined on opposite sides of the break, wherein the break receives the set of bicycle handlebars, the mount being resiliently flexible such that the mount is snapped onto and frictionally engaged with the set of bicycle handlebars, the perimeter wall having an upper portion and a lower portion positioned opposite of each other, the break being positioned in the lower portion, the mount being comprised of a rigid and resiliently bendable material;
a cushioning member being removably attached to the mount, the cushioning member comprising:
a plate having a top surface, a bottom surface and a perimeter edge, the plate comprising a rigid material;
a resiliently compressible member being positioned on the top surface of the plate; and
a securing member releasably securing the cushioning member to the mount wherein the mount is positioned between the set of bicycle handlebars and the cushioning member.

16. The cushioning system according to claim 15, wherein the resiliently compressible member is selected from the group including an air bladder, a foam material, a gel material, and a compressible coating.

17. The cushioning system according to claim 16, wherein the securing member is selected from the group including male and female snap members, hook and loop couplers, and magnetic couplers.

18. The cushioning system according to claim 15, wherein the securing member is selected from the group including male and female snap members, hook and loop couplers, and magnetic couplers.

19. The cushioning system according to claim 15, wherein the mount has a receiving space positioned therein, the cushioning member being positioned in and extending upwardly and outwardly from said receiving space.

20. A cushioning system for a positioning on bicycle handlebars, the system comprising:
a mount being contoured such that the mount is configured to be complementary in shape to a set of bicycle handlebars, the mount having a perimeter wall, the perimeter wall having a first end and a second end and being elongated from the first end to the second end, the perimeter wall having an elongated break therein extending between and through the first and second ends, a first free edge of the perimeter wall and a second free edge of the perimeter wall being defined on opposite sides of the break, wherein the break is configured to receive the handlebars, the mount being resiliently flexible such that the mount snaps onto and is configured to frictionally engage the bicycle handlebars, the perimeter wall having an upper portion and a lower portion positioned opposite of each other, the break being positioned in the lower portion, the mount being comprised of a rigid and resiliently bendable material;
the perimeter wall having an outer surface having a receiving space therein that is elongated, the receiving space being bounded by a peripheral edge, the outer surface facing away from the handlebars when the mount is positioned on the handlebars, the mount having an inner surface abutting the handlebars, the receiving space having a bottom wall;
the receiving space extending from a position adjacent to the first end to a position adjacent to the second end, the receiving space being spaced from the break a distance greater than 0.25 inches, the peripheral edge including a first edge positioned adjacent to the first end, a second edge positioned adjacent to the second end, a forward edge and a rearward edge each extending between the first and second edges, the forward and rearward edges being spaced from each other a distance equal to at least 0.75 inches;
a cushioning member being removably positioned in the receiving space, the cushioning member comprising:
 a plate having a top surface, a bottom surface and a perimeter edge, the plate being removably positioned in the receiving space such that the perimeter edge is bounded by the peripheral edge;
 a resiliently compressible member being positioned on the top surface of the plate, a height of the resiliently compressible member and the plate being greater than a depth of the receiving space such that the resiliently compressible member extends outwardly from the receiving space, the resiliently compressible member being selected from the group including an air bladder, a foam material, a gel material, and a compressible coating;
a securing member releasably securing the cushioning member to the mount, the securing member being selected from the group including male and female snap members, hook and loop couplers, and magnetic couplers; and
the perimeter edge having a notch therein to facilitate removal of the plate from the receiving space.

* * * * *